United States Patent

Shimizu

[11] Patent Number: 5,831,628
[45] Date of Patent: Nov. 3, 1998

[54] POLYGON OVERLAP EXTRACTION METHOD, AND POLYGON GROUPING METHOD AND APPARATUS

[75] Inventor: Seiya Shimizu, Kawasaki, Japan

[73] Assignee: Fujitsu Limited, Kawasaki, Japan

[21] Appl. No.: 658,561

[22] Filed: Jun. 5, 1996

[30] Foreign Application Priority Data

Aug. 31, 1995 [JP] Japan ..................................... 7-223782

[51] Int. Cl.$^6$ ............................... G06T 1/20; G06T 11/60
[52] U.S. Cl. ............................................. 345/435; 345/505
[58] Field of Search ................................... 345/421, 422, 345/435, 505

[56] References Cited

U.S. PATENT DOCUMENTS

| | | | |
|---|---|---|---|
| 4,924,414 | 5/1990 | Ueda | 395/122 |
| 4,970,636 | 11/1990 | Snodgrass et al. | 395/122 X |
| 5,027,292 | 6/1991 | Rossignac et al. | 395/122 |
| 5,280,568 | 1/1994 | Obata | 395/121 |
| 5,471,567 | 11/1995 | Soderberg et al. | 395/122 X |

*Primary Examiner*—Mark K. Zimmerman
*Attorney, Agent, or Firm*—Staas & Halsey

[57] ABSTRACT

A polygon overlap extraction method extracts an overlapping relationship of polygons in a computer graphics system which plots a polygon having a transmitting attribute and a polygon having a non-transmitting attribute based on a polygon model. The polygon overlap extraction method includes the steps of (a) obtaining a first value which indicates a visible surface from data related to the polygon having the non-transmitting attribute and a second value which indicates a visible surface from data related to both the polygons having the non-transmitting attribute and the transmitting attribute, with respect to each pixel, (b) comparing the first value and the second value and judging whether or not an overlapping relationship exists between the polygon having the transmitting attribute and the polygon having the non-transmitting attribute at each pixel, and (c) obtaining a polygon set of the polygon having the non-transmitting attribute and the polygon having the transmitting attribute which are judged as having the overlapping relationship.

15 Claims, 10 Drawing Sheets

POLYGON OVERLAP EXTRACTION METHOD, AND POLYGON GROUPING METHOD AND APPARATUS

BACKGROUND OF THE INVENTION

The present invention relates generally to polygon overlap extraction methods and polygon grouping methods and apparatuses, and more particularly to a polygon overlap extraction method which extracts overlap of polygons of a polygon model described by computer aided design (CAD) data, to a polygon grouping method which statically groups polygons when distributing the polygons to computer graphics (CG) accelerators which plot the computer graphics, and to a polygon grouping apparatus which employs such a polygon grouping method.

Conventionally, in order to create computer graphics images at a high speed, a plurality of CG accelerators, are coupled in parallel within a CG plotting apparatus. The coupled CG accelerators are processors for plotting the computer graphics. Each CG accelerator creates a partial computer graphics image, and the entire computer graphics image is plotted by synthesizing the images created by each of the CG accelerators.

FIG.1 is a flow chart for explaining a conventional CG plotting method and a polygon distributing method employed thereby. According to the conventional method, model data which are typically polygon data are read from a CAD model database 2 in step S500. Although FIG.1 only shows 3 CG accelerators $22_1$, $22_2$ and $22_3$, N CG accelerators are used. Polygons of the computer graphics model are distributed with respect to the N CG accelerators in step S502.

The most typical and simple method of distributing the polygons of the computer graphics model is to distribute the polygons to the N CG accelerators, depending on the registered sequence of the polygons. In this case, the pth registered polygon is plotted by a (p%N+1)th CG accelerator, where the symbol "%" indicates a remainder operator. According to this method, it is possible to automatically distribute the loads on the CG accelerators independently of the computer graphics model.

The CG accelerators $22_1$, $22_2$, $22_3$ with the distributed loads plot the polygons in step S504, and output computer graphics images with Z values in step S506. The Z value matches the depth when the direction of the line of vision (or the visual axis) is taken as the Z direction, and is the depth information used in the known Z buffer algorithm.

The Z values are compared for the computer graphics images output from each of the CG accelerators $22_1$, $22_2$, $22_3$. The computer graphics images are synthesized so that a point located in front of an already plotted point is newly plotted in step S508. The synthesized CM image is output to a display unit in step S510.

Furthermore, according to the above method, a polygon having an α value that is not equal to 1.0 is plotted as a transmitting object in accordance with the known alpha (α) blending technique.

In the description given above, it is assumed for the sake of convenience that there is no plotting-order-dependent relationship among the polygons to be plotted. The plotting-order-dependent relationship refers to a restrictive condition such as requiring a first polygon to be plotted before a second polygon. Accordingly, when such a plotting-order-dependent relationship exists among the polygons to be plotted, the first polygon and the second polygon must be distributed to the same CG accelerator with the restrictive condition that the first polygon always be plotted before the second polygon. For this reason, the operator of the CG plotting apparatus would have to carry out certain processes, such as creating a model in advance by grouping the polygons depending on the plotting-order-dependent relationship between the polygons and distributing the polygons belonging to the same group to the same CG accelerator.

For example, when plotting a model in which a polygon having a transmitting attribute and a polygon having a non-transmitting attribute coexist, the plotting-order-dependent relationship exists between the two polygons if the polygon having the transmitting attribute is located in front of and overlaps the second polygon. That is, if a concealed relationship exists between the two polygons. In other words, the polygon having the transmitting attribute and the polygon located in back, must be distributed to the same CG accelerator. In addition, the polygon located at the back must always be plotted before the polygon having the transmitting attribute.

According to the conventional method described above, the polygon having the transmitting attribute is plotted as a transmitting object. However, the polygons are automatically distributed to the CG accelerators independently of the plottingorder-dependent relationship unless the operator of the CG plotting apparatus carries out the processes described above. As a result, it is possible that the polygon having the transmitting attribute and the polygon located in the back are distributed to different CG accelerators, making the plotting of the transmitting object unnatural.

On the other hand, having to create the model in advance by grouping the polygons, depending on plotting-order-dependent relationships and distributing the polygons belonging to the same group to the same CG accelerator, becomes a big burden on the operator of the CG plotting apparatus. The operator must interactively group the polygons for each model. As a result, it is possible that the operator may make an error during the grouping of the polygons.

SUMMARY OF THE INVENTION

Accordingly, it is a general object of the present invention to provide a novel and useful polygon overlap extraction method and polygon grouping method and apparatus, in which the problems described above are eliminated.

Another and more specific object of the present invention is to provide a polygon overlap extraction method which extracts an overlapping relationship of polygons in a computer graphics system which plots a polygon having a transmitting attribute and a polygon having a non-transmitting attribute based on a polygon model, which polygon overlap extraction method comprises the steps of (a) obtaining a first value which indicates a visible surface from data related to the polygon having the non-transmitting attribute and a second value which indicates a visible surface from data related to both the polygons having the non-transmitting attribute and the transmitting attribute, with respect to each pixel, (b) comparing the first value and the second value and judging whether or not an overlapping relationship exists between the polygon having the transmitting attribute and the polygon having the non-transmitting attribute at each pixel, and (c) obtaining a polygon set of the polygon having the non-transmitting attribute and the polygon having the transmitting attribute which are judged as having the overlapping relationship. According to the polygon overlap extraction method of the present invention, the computer graphics image is created in advance, and the polygons having the plotting-order-dependent relationship are judged and categorized into one group when carrying out the alpha blending process. Hence, when carrying out the plotting process for each group, it is possible to naturally plot the transmitting object.

Still another object of the present invention is to provide a polygon grouping method comprising the steps of (a) reading polygon data related to polygons of a computer graphics model, and (b) distributing the polygons within the polygon data to computer graphics accelerators which are processors and plot the computer graphics, where the step (b) includes a view point information setting step of setting view point information for plotting the computer graphics, an image forming step of obtaining a first value which indicates a visible surface from data related to the polygon having the non-transmitting attribute and a second value which indicates a visible surface from data related to both the polygons having the non-transmitting attribute and the transmitting attribute, with respect to each pixel, a judging step of comparing the first value and the second value and judging whether or not an overlapping relationship exists between the polygon having the transmitting attribute and the polygon having the non-transmitting attribute at each pixel, a polygon set extracting step of obtaining a polygon set of the polygon having the non-transmitting attribute and the polygon having the transmitting attribute which are judged as having the overlapping relationship, and a polygon set distributing step of distributing the polygon sets to the accelerators. According to the polygon grouping method of the present invention, the view point information that is already used or the information related to the already grouped polygons is stored. Hence, when grouping the polygons by adding a new object to the computer graphics image, it is possible to efficiently regroup the polygons by using the stored information.

A further object of the present invention is to provide a polygon grouping apparatus comprising first image generating means for generating a first pixel value corresponding to a polygon having a non-transmitting attribute or a background in response to polygon data of a computer graphics model and view point information that is used for plotting the computer graphics model, second image generating means for generating a second pixel value corresponding to a polygon having the non-transmitting or transmitting attribute or the background in response to the polygon data of the computer graphics model and the view point information, polygon set extracting means for comparing the first pixel value generated by the first image generating means and the corresponding second pixel value generated by the second image generating means to judge whether or not the polygon having the non-transmitting attribute conceals the polygon having the transmitting attribute and for extracting the polygon having the non-transmitting attribute and the polygon having the transmitting attribute as a polygon set if the polygon having the non-transmitting attribute conceals the polygon having the transmitting attribute, and polygon group determination means for distributing the polygon sets from the polygon set extracting means to a plurality of accelerators for plotting computer graphics. According to the polygon grouping apparatus of the present invention, the view point information that is already used or the information related to the already grouped polygons is stored. Hence, when grouping the polygons by adding a new object to the computer graphics image, it is possible to efficiently regroup the polygons by using the stored information.

Other objects and further features of the present invention will be apparent from the following detailed description when read in conjunction with the accompanying drawings.

DESCRIPTION OF THE PREFERRED EMBODIMENTS

Figure 1:
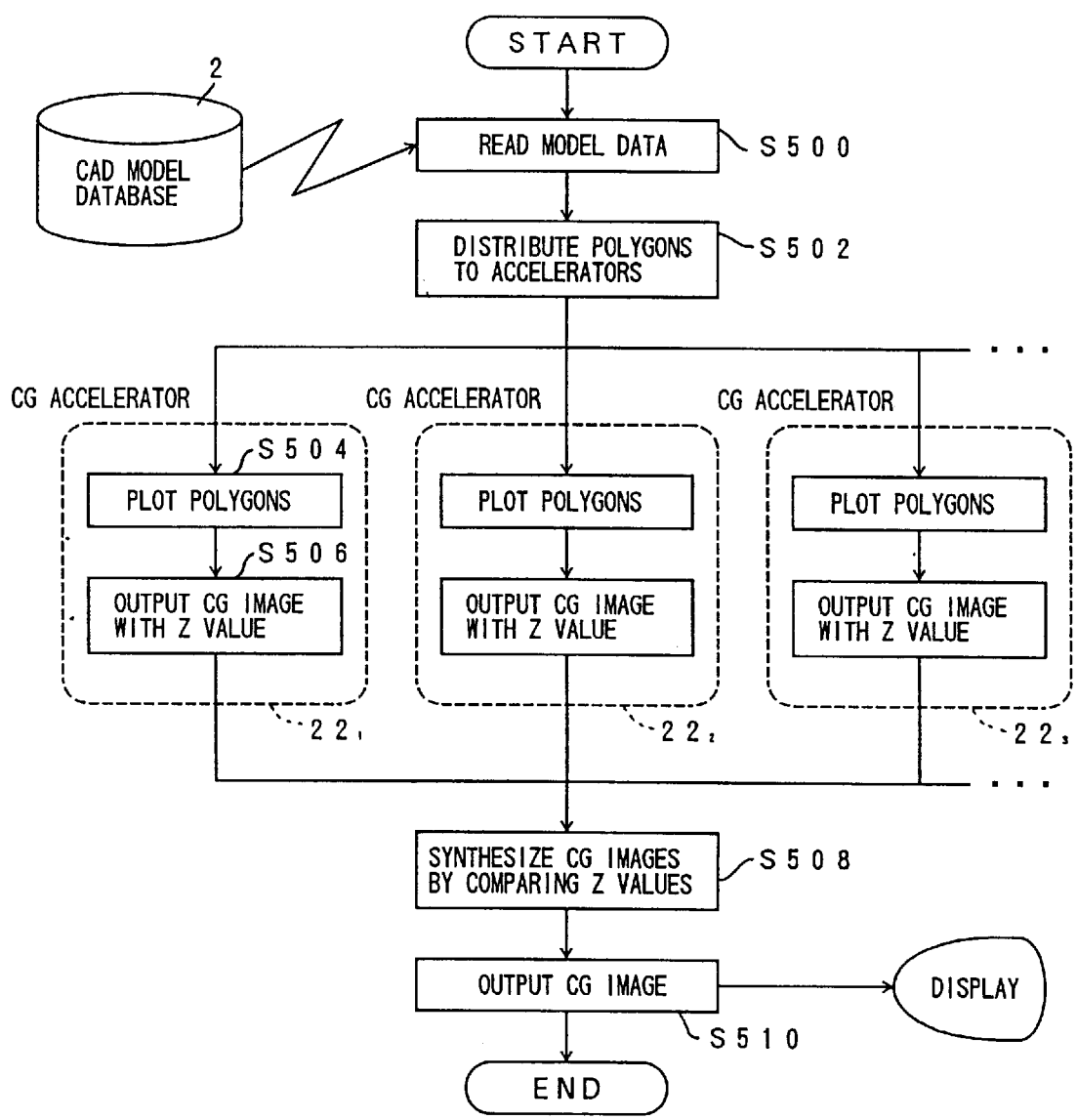
FIG. 1 is a flow chart for explaining a conventional computer graphics plotting method and a polygon distributing method employed thereby.
Figure 2:
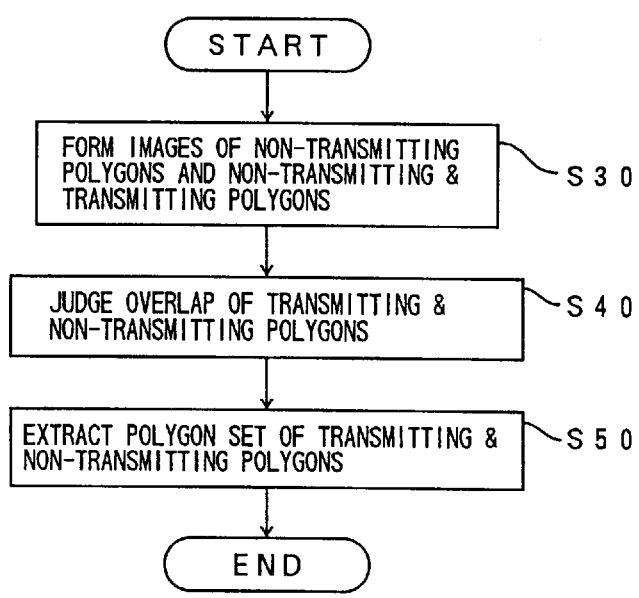
FIG. 2 is a flow chart for explaining the general operation of an embodiment of a polygon overlap extraction method according to the present invention.

FIG. 2 is a flow chart for explaining the general operation of an embodiment of a polygon overlap extraction method according to the present invention. The polygon overlap extraction method extracts an overlapping relationship of polygons in a computer graphics system which plots a polygon having a transmitting attribute and a polygon having a non-transmitting attribute based on a polygon model.

In FIG. 2, an image forming step S30 obtains a first value which indicates a visible surface, from data related to the polygon having the non-transmitting attribute. In addition a second value which indicates a visible surface, is obtained from data related to both the polygons having the non-transmitting attribute and the transmitting attribute. The first and second values are obtained for each pixel. A judging step S40 then compares the first value and the second value, and judges whether an overlapping relationship exists between the polygon having the transmitting attribute and the polygon having the non-transmitting attribute at each pixel. Furthermore, a polygon set extracting step S50 obtains a polygon set of the polygon having the non-transmitting attribute and the polygon having the transmitting attribute judged as having the overlapping relationship.

According to this embodiment of the polygon overlap extraction method, two kinds of images, that is, a first image and a second image, are formed in the image forming step S30 from the first and second values with respect to each pixel. The first image indicates a visible surface that is obtained using only data of the polygon having the non-transmitting attribute. On the other hand, the second image indicates a visible surface that is obtained using data of both the polygons having the non-transmitting attribute and the transmitting attribute. Hence, if the polygon having the transmitting attribute overlaps the polygon having the non-transmitting attribute, and the polygon having the transmitting attribute appears on the visible surface, the pixel of the first image and the corresponding pixel of the second image have different values. For this reason, it is possible to extract the overlapping relationship of the polygon having the transmitting attribute and the polygon having the non-transmitting attribute by comparing the first image and the second image. The α the blending technique is used exclusively for the polygon having the transmitting attribute. But when forming the second image, the image of the polygon having the transmitting attribute is not formed by using the α blending technique. Rather when forming the second image, the image of the polygon having the transmitting attribute is formed by the same method that is used for the image of the polygon having the non-transmitting attribute.

The polygon having the transmitting attribute and the polygon having the non-transmitting attribute which have the overlapping relationship form a pair of polygons hereinafter referred to as a polygon set.

Furthermore, according to this embodiment of the polygon overlap extraction method, the polygon set extracting step S50 stores the overlapping relationship, that is, the dependent relationship among the polygons, in the following accumulative manner. If the polygon having the non-transmitting attribute and the polygon having the transmitting attribute, which are judged as having the overlapping relationship, both do not match the polygons within a polygon set that is already extracted, a new polygon set is formed consisting of the polygon having the non-transmitting attribute and the polygon having the transmitting attribute. In addition, if one of the polygons having the non-transmitting attribute and the transmitting attribute and judged as having the overlapping relationship matches the polygon within the polygon set that is already extracted, the other of the polygons having the non-transmitting attribute and the transmitting attribute is added to the above polygon set that is already extracted. On the other hand, if both of the polygons having the non-transmitting attribute and the transmitting attribute and judged as having the overlapping relationship match the polygons within a separate polygon set that is already extracted, this separate polygon set is combined with another polygon set. Moreover, if both the polygons having the non-transmitting attribute and the transmitting attribute match the polygons within the polygon set that is already extracted, this polygon set that is already extracted is maintained as it is.

An embodiment of a polygon grouping method according to the present invention employs the embodiment of the polygon overlap extraction method described above.

More particularly, this embodiment of the polygon grouping method includes a step of reading polygon data related to polygons of a computer graphics model, and a polygon distributing step of distributing the polygons within the polygon data to computer graphics (CG) accelerators which are processors and plot the computer graphics.

The polygon distributing step includes a view point information setting step of setting view point information for plotting the computer graphics, an image forming step of obtaining a first value which indicates a visible surface from data related to the polygon having the non-transmitting attribute and a second value which indicates a visible surface from data related to both the polygons having the non-transmitting attribute and the transmitting attribute, with respect to each pixel, a judging step of comparing the first value and the second value and judging whether or not an overlapping relationship exists between the polygon having the transmitting attribute and the polygon having the non-transmitting attribute at each pixel, a polygon set extracting step of obtaining a polygon set of the polygon having the non-transmitting attribute and the polygon having the transmitting attribute which are judged as having the overlapping relationship, and a polygon set distributing step of distributing the polygon sets to the accelerators.

According to this embodiment of the polygon grouping method, the polygons having the overlapping relationship, that is, having the plotting-order-dependent relationship, belong to the same polygon set. For this reason, the polygons having the plotting-order-dependent relationship are distributed to the same accelerator by distributing the polygons to the accelerators in units of polygon sets. As a result, it is possible to plot transmitting objects.

An embodiment of a polygon grouping apparatus according to the present invention employs the embodiment of the polygon overlap extraction method and the polygon grouping method described above.

More particularly, the polygon grouping apparatus includes a first image generating means for generating a first pixel value corresponding to a polygon having a non-transmitting attribute or a background in response to polygon data of a computer graphics model and view point information that is used for plotting the computer graphics model, a second image generating means for generating a second pixel value corresponding to a polygon having the non-transmitting or transmitting attribute or the background in response to the polygon data of the computer graphics model and the view point information, a polygon set extracting means for comparing the first pixel value generated by the first image generating means and the corresponding second pixel value generated by the second image generating means to judge whether or not the polygon having the non-transmitting attribute conceals the polygon having the transmitting attribute and for extracting the polygon having the non-transmitting attribute and the polygon having the transmitting attribute as a polygon set if the polygon having the non-transmitting attribute conceals the polygon having the transmitting attribute, and a polygon group determination means for distributing the polygon sets from the polygon set extracting means to a plurality of accelerators for plotting computer graphics. In other words, the polygon group determination means distributes the polygon data of the computer graphics model to the accelerators so that the polygons having the plotting-order-dependent relationship are distributed to the same accelerator. The plotting-order-dependent relationship refers to a restrictive condition such as a restriction that requires a first polygon to be plotted before a second polygon.

According to this embodiment of the polygon grouping apparatus, the polygons having the overlapping relationship, that is, having the plotting-order-dependent relationship, belong to the same polygon set. For this reason, the polygons having the plotting-order-dependent relationship are distributed to the same accelerator by distributing the polygons to the accelerators in units of polygon sets. As a result, it is possible to plot transmitting objects.

Next, a more detailed description will be given of the above described embodiments of the polygon overlap extraction method, the polygon grouping method and the polygon grouping apparatus, by referring to the embodiment of the polygon grouping apparatus.

Figure 3:
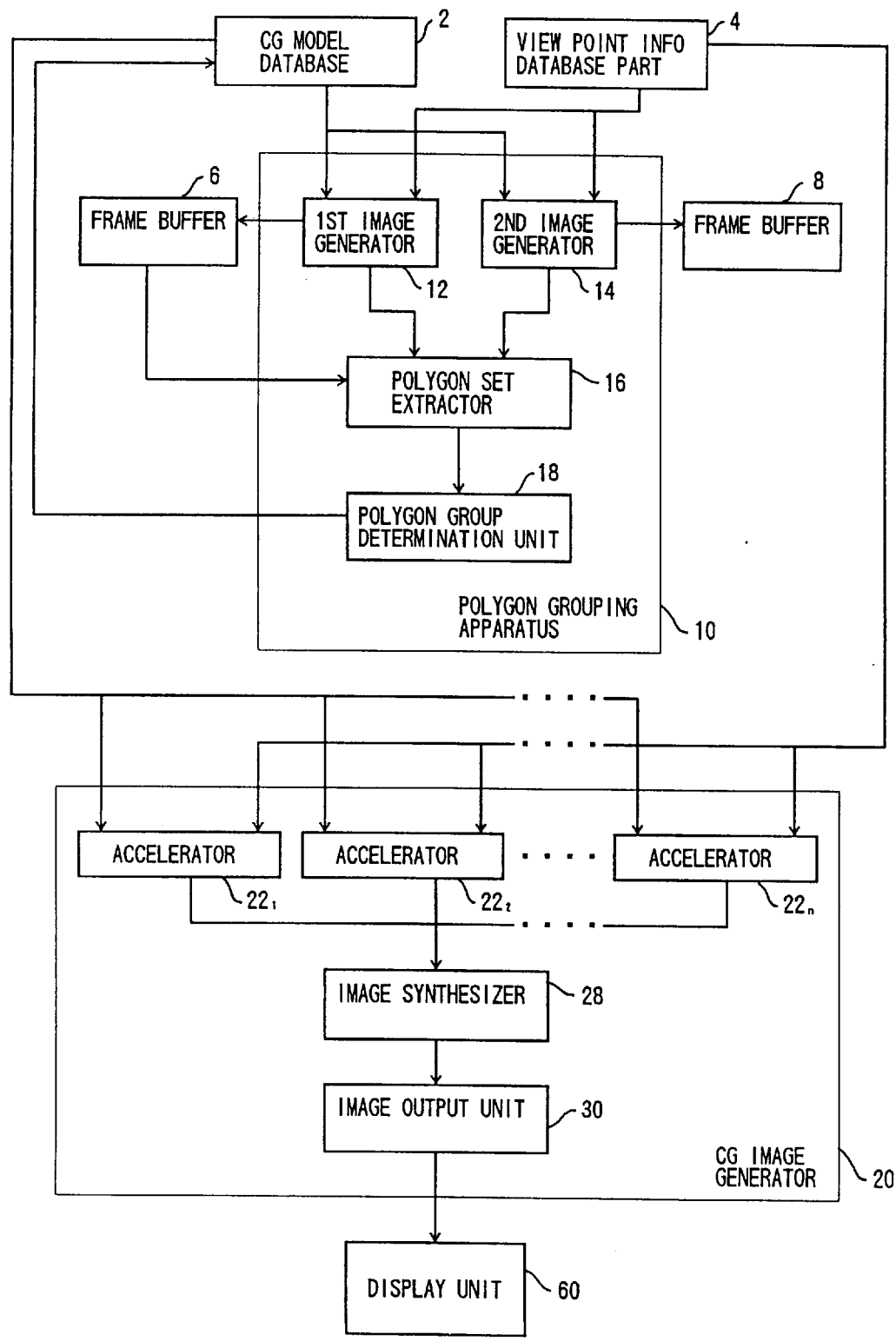
FIG. 3 is a system block diagram showing an image processing system applied with an embodiment of a polygon grouping apparatus according to the present invention.

FIG. 3 is a system block diagram showing an image processing system applied with the embodiment of the polygon grouping apparatus. The image processing system shown in FIG. 3 includes a computer graphics (CG) model database 2 which stores CG models described by 3-dimensional polygon data, a view point information database part 4 which provides the view point information when generating the computer graphics image, a polygon grouping apparatus 10 which groups the polygons, frame buffers 6 and 8 which are used when grouping the polygons, and a computer graphics image generator 20.

The polygon grouping apparatus 10 groups the polygons forming the CG model based on the polygons having the non-transmitting attribute and the plotting restrictive conditions of the polygons which are concealed by the polygons having the non-transmitting attribute, and converts the grouped polygons into input data which are supplied to a plurality of computer graphics (CG) plotting accelerators $22_1$ through $22_n$ which are coupled in parallel.

The polygon grouping apparatus 10 includes a first image generator 12, a second image generator 14, a polygon set extractor 16, and a polygon group determination unit 18. The first image generator 12 generates a first pixel value corresponding to a polygon having a non-transmitting attribute or a background in response to the polygon data from the CG model database 2 and the view point information from the view point information database part 4. The second image generator generates a second pixel value corresponding to a polygon having the non-transmitting or transmitting attribute or the background in response to the polygon data from the CG model database 2 and the view point information from the view point information database part 4. The polygon set extractor 16 compares the first pixel value generated by the first image generator 12 and the corresponding second pixel value generated by the second image generator 14 to judge whether or not the polygon having the non-transmitting attribute conceals the polygon having the transmitting attribute, and extracts the polygon having the non-transmitting attribute and the polygon having the transmitting attribute as a polygon set if the polygon having the non-transmitting attribute conceals the polygon having the transmitting attribute. The polygon group determination unit 18 distributes the polygon data in units of the polygon sets from the polygon set extractor 16 to the CG plotting accelerators $22_1$ through $22_n$, so that the polygons having the plotting-oder-dependent relationship are distributed to the same CG plotting accelerator.

The computer graphics image generator 20 includes the n CG plotting accelerators $22_1$ through $22_n$ which generate the computer graphics images by plotting the grouped polygons, an image synthesizer 28 which synthesizes the images generated from each of the CG plotting accelerators $22_1$ through $22_n$, and an image output unit 30 which outputs the synthesized image to a display unit 60.

For example, the view point information database part 4 may be constructed so that the view point information is prestored as time-sequential data and the time-sequential data is successively readable for every frame of the computer graphics image.

Figure 4:
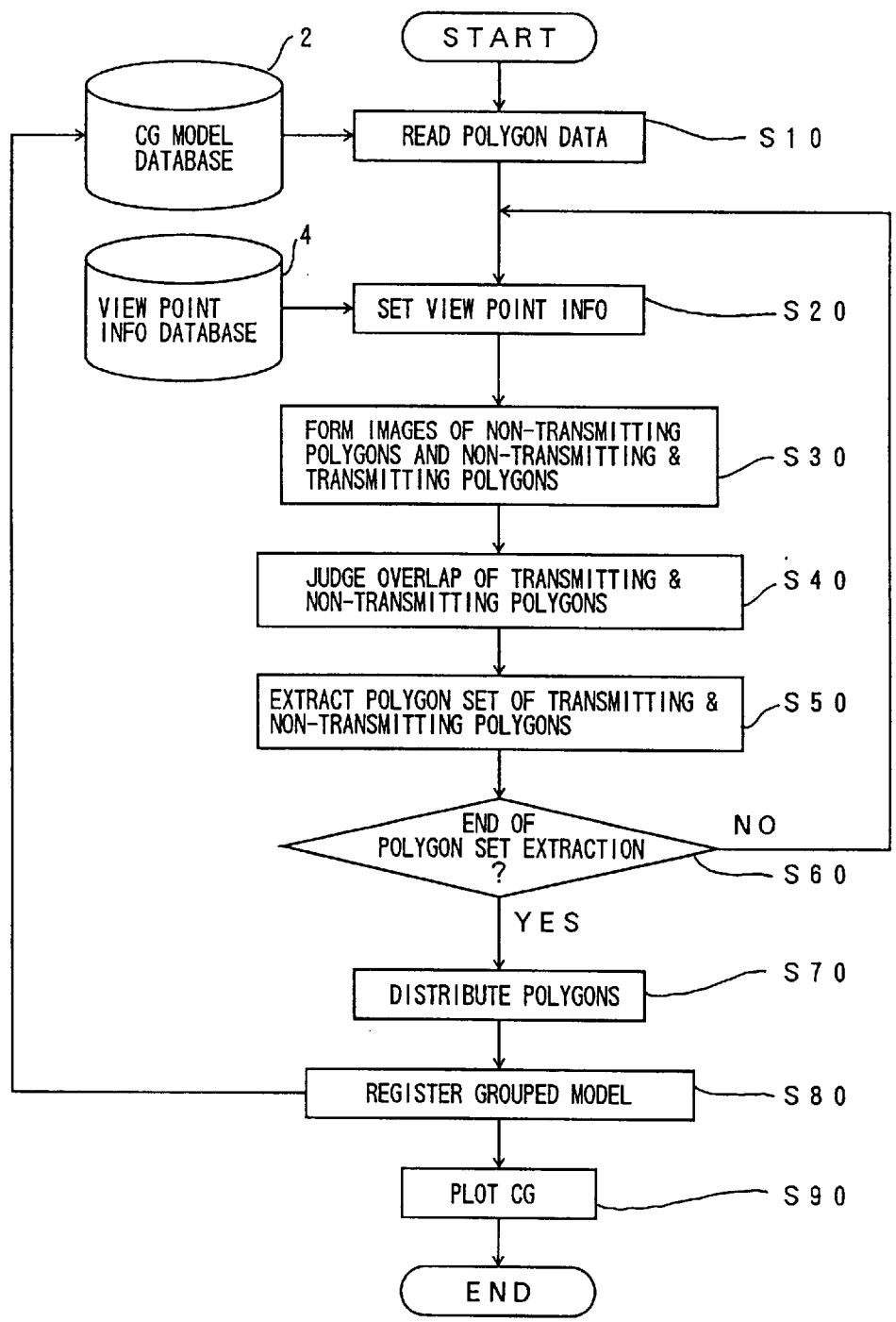
FIG. 4 is a flow chart for explaining the operation of the embodiment of the polygon grouping apparatus.

FIG. 4 is a flow chart for explaining the operation of this embodiment of the polygon grouping apparatus shown in FIG. 3.

For example, the first image generator 12 and the second image generator 14 read 4 triangular polygons A, B, C and D from the CG model database 2 in a step S10 shown in FIG. 4.

Figure 5:
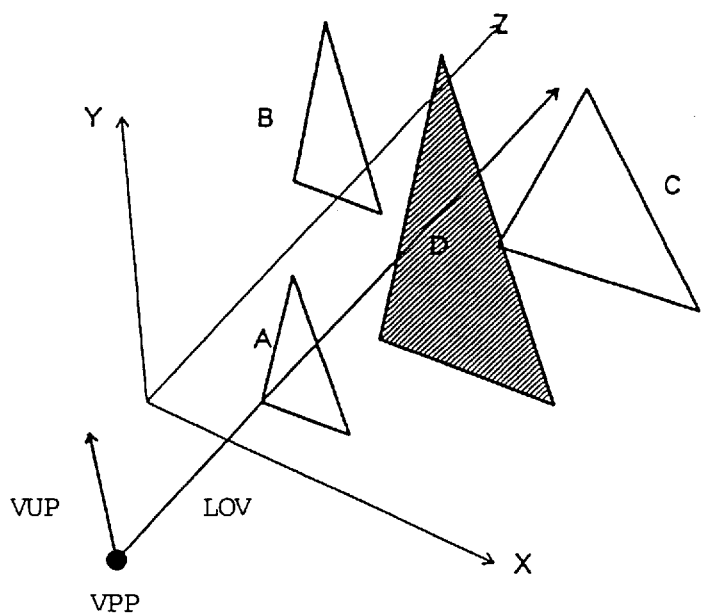
FIG. 5 is a diagram for explaining a computer graphics model and view point information.

FIG. 5 is a diagram showing the CG model which is made up of the 4 triangular polygons A, B, C and D. The triangular polygons A, B and C are polygons having the non-transmitting attribute, and the triangular polygon D is a polygon having the transmitting attribute.

Next, the first image generator 12 and the second image generator 14 inputs the view point information from the view point information database part 4 in a step S20. This view point information includes information related to a view point position VPP, a direction LOV of the line of vision, and a vector VUP in the upward direction as shown in FIG. 5.

In a step S30, the first image generator 12 creates a first image of the polygons having the non-transmitting attribute and stores the first image in the frame buffer 6. In addition, in this step S30, the second image generator 12 creates a second image of the polygons having the non-transmitting attribute and the transmitting attribute, and stores the second image in the frame buffer 8. The first image is plotted with the image of only the polygon having the non-transmitting attribute with $\alpha=1.0$. On the other hand, the second image is plotted with the image of the polygons having the non-transmitting attribute with $a\alpha=1.0$ and the image of the polygon having the transmitting attribute with $\alpha$ value not equal to 1.0. The polygon having the transmitting attribute is plotted using the same technique that is used to plot the polygon having the non-transmitting attribute. For this reason, it should be noted that the blending or alpha blending is not carried out with respect to the polygon having the transmitting attribute.

Figure 6A:
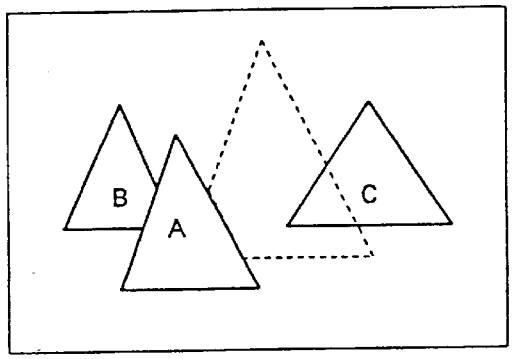
FIGS. 6A and 6B are diagrams for explaining images generated in the embodiment of the polygon grouping apparatus.
Figure 6B:
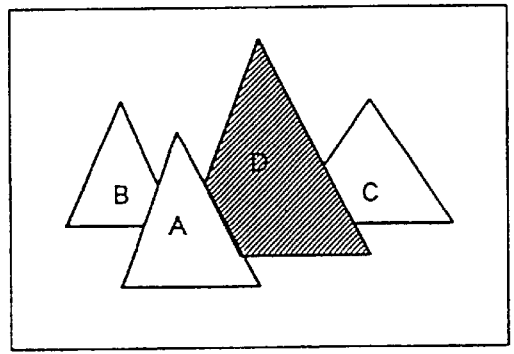

FIGS. 6A and 6B are diagrams showing the images generated by the first and second image generators 12 and 14, from which the polygon set is extracted. FIG. 6A shows the first image generated by the first image generator 12, and FIG.6B shows the second image generated by the second image generator 14. A region surrounded by the dotted line in FIG.6A corresponds to the polygon D having the transmitting attribute, and this polygon D does not exist in the first image. The region corresponding to the polygon D having the transmitting attribute is indicated by hatching in FIG.6B, and this polygon D does exist in the second image.

The polygon set extractor 16 compares the pixel value of the first image shown in FIG.6A that is created by the first image generator 12 and the pixel value of the second image shown in FIG.6B that is created by the second image generator 14, and judges overlaps of the polygon having the transmitting attribute and the polygons having the non-transmitting attribute in a step S40 shown in FIG.4. A region in which the overlapping relationship of the polygon having the transmitting attribute and the polygons having the non-transmitting attribute exists, that is, the concealed relationship exists, corresponds to the polygon having at least a portion thereof plotted in the region indicated by the dotted line in FIG.6A. In this particular case, the polygon D having the transmitting attribute conceals the polygon C having the non-transmitting attribute. Hence, the overlapping relationship or the plotting-order-dependent relationship exists between the polygon C and the polygon D.

The polygon set extractor 16 considers the set of polygons {C, D} obtained in the step S40 as a polygon set candidate, and a new polygon set {C, D} is formed and stored in a step S50 if both the polygons C and D do not match the polygons within an already extracted polygon set that is already extracted. If one of the polygons C and D matches the polygons within the already extracted polygon set, the other of the polygons C and D is added to the already extracted polygon set in the step S50. If both the polygons C and D match the polygons within a separate polygon set that is already extracted, the separate polygon set is combined with another polygon set in the step S50. If both the polygons C and D match the polygons within the already extracted polygon set, the already extracted polygon set is maintained as it is in the step S50.

Accordingly, the plotting-order-dependent relationship is stored accumulatively. For example, when extracting the overlapping relationship based on certain view point information, the plotting-order-dependent relationship of the polygons "a" and "b" is obtained, and {a, b} is registered as a polygon set. In this case, when extracting the overlapping relationship based on another view point information (that is, changed field of view), {a, b, c} is registered as a polygon set when the plotting-order-dependent relationship of the polygons "a" and "c" is obtained. A polygon which does not have a plotting-order-dependent relationship with any of the polygons is preferably treated as an independent polygon set having a single element, for example.

Next, the polygon set extractor 16 decides whether or not the extraction of the polygon set based on all necessary view point information has been made and ended in a step S60. If the view point information with which the polygon set extraction should be made still exists and the decision result in the step S60 is NO, the process returns to the step S20 and the processes of the steps S20 through S50 are repeated. On the other hand, if the polygon set extraction based on all view point information is ended and the decision result in the step S60 is YES, the process advances to a step S70. Of course, it is possible for the operator to specify from a keyboard or the like whether or not the next polygon set extraction should be made, Furthermore, it is possible to end the polygon set extraction process by an interrupt signal generated responsive to an operation made from the keyboard or the like by the operator. For example, an input device such as the keyboard may be coupled to the polygon grouping apparatus 10 or the computer graphics image generator 20 shown in FIG. 3 or, a processor (not shown) that controls the operation of the image processing system shown in FIG. 3.

The polygon group determination unit 18 obtains the polygon sets extracted by the polygon set extractor 16, and distributes the polygon sets in groups corresponding to the CG plotting accelerators $22_1$ through $22_n$ in the step S70 so that the load with respect to the CG plotting accelerators $22_1$ through $22_n$ is distributed. Generally, the number n of the CG plotting accelerators $22_1$ through $22_n$ matches the number of groups. In order to distribute the load with respect to the CG plotting accelerators $22_1$ through $22_n$, the polygon sets are distributed so that the total number of polygons included in each group becomes averaged and uniform as much as possible or, the total area of the polygons included in each group becomes averaged and uniform as much as possible. Of course, other distribution methods may be employed as long as the load with respect to the CG plotting accelerators $22_1$ through $22_n$ is distributed evenly as much as possible.

Next, in a step S80, the polygon group determination unit 18 registers the groups of polygon sets obtained by the distribution made in the step S70 in the CG model database 2. By registering the distributed groups of polygon sets, it becomes unnecessary to group the polygon sets each time when the computer graphics are plotted thereafter or when a new polygon set is added based on the already grouped polygon sets, for example.

After registering the grouped polygon sets in the CG model database 2, the computer graphics is plotted in a step S90. Each of the CG plotting accelerators $22_1$ through $22_n$ obtains the data of the CG model corresponding to the polygon set from the CG model database 2 and obtains the view point information from the view point information database part 4. Based on the obtained information, each of the CG plotting accelerators $22_1$ through $22_n$ creates polygon images using the Z buffer algorithm, and sends the computer graphics images with the Z value to the image synthesizer 28. In this particular case, the polygon D having the transmitting attribute is subjected to the alpha blending process and is plotted as a transmitting object. The image synthesizer 28 synthesizes the computer graphics images based on the Z values, and outputs the synthesized image to the display unit 60 via the image output unit 30.

A more detailed description will be given of the image forming operation of the first and second image generators 12 and 14 of this embodiment.

First, the first image generator 12 creates the first image of the polygons having the non-transmitting attribute and stores the first image in the frame buffer 6 as described above. This first image plots only the polygons having the non-transmitting attribute with $\alpha=1.0$. A polygon identifier (ID) peculiar to each polygon is added to each of the CG models stored in the CG model database 2. For example, the polygon ID is a 24-bit integer from 1 to 1,677,215 ($2^{24}-1$).

The first image generator 12 creates the computer graphics image using the polygon lettering of the general Z buffer algorithm. The background is plotted by pixel values of 0X000000, and the inside of each polygon is filled by the 24-bit polygon IDs as the pixel values, where "X" denotes a don't care. For example, the frame buffer 6 has a memory capacity of 640×480×24 bits. When the plotting ends, the polygon ID is only written in the region of the frame buffer 6 corresponding to the polygon having the non-transmitting attribute, and the value of the background is 0X000000.

Figure 7:
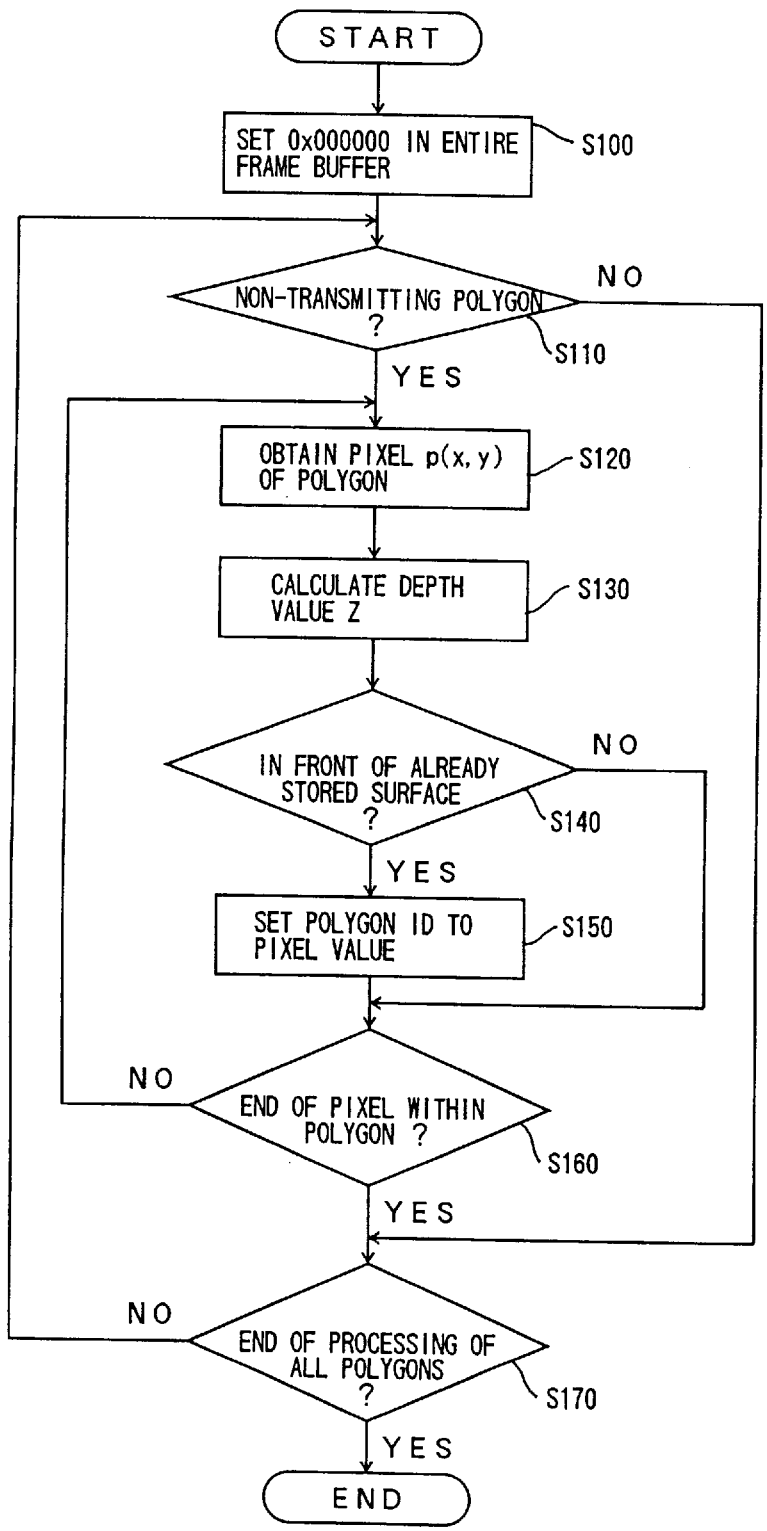
FIG. 7 is a flow chart for explaining the operation of a first image generator in the embodiment of the polygon grouping apparatus.

FIG. 7 is a flow chart for explaining the operation of the first image generator 12. The first image generator 12 initially sets 0X000000 in the entire frame buffer 6 in a step S100, and decides whether or not the detected polygon is a non-transmitting polygon in a step S110. If the decision result in the step S110 is NO, the process advances to a step S170 which will be described later so as to process a next polygon if any. On the other hand, if the decision result in the step S110 is YES, a polygon pixel p(x, y) within the polygon is obtained in a step S120, and the depth value Z of this pixel is calculated in a step S130. A step S140 decides whether or not the calculated depth of the pixel is located in front of a surface which is already stored, and if the decision result is NO, the process advances to a step S160 which will be described later so as to process the next pixel. On the other hand, if the decision result in the step S140 is YES, a step S150 sets the polygon ID to the pixel value of the pixel p(x, y). The step S160 decides whether or not the end of the pixel within the polygon is reached, and the process returns to the step S120 if the decision result in the step S160 is NO. On the other hand, if the decision result in the step S160 is YES, the step S170 decides whether or not the processing of all polygons has ended. The process returns to the step S110 if the decision result in the step S170 is NO, so as to process the next polygon. The operation of generating the first image ends if the decision result in the step S170 is YES.

On the other hand, the second image generator 14 creates the second image of the polygons having the non-transmitting and transmitting attributes and stores the second image in the frame buffer 8 as described above. This second image plots the polygons having the non-transmitting attribute with α=1.0 and the polygons having the transmitting attribute with α value which is not equal to 1.0.

The second image generator 14 creates the computer graphics image using the Z buffer algorithm, similarly to the first image generator 12. The background and the polygons having the non-transmitting attribute are plotted by pixel values of 0X000000. The second image generator 14 also plots the polygon having the transmitting attribute with α value which is not equal to 1.0, but the polygons having the transmitting attribute are not plotted by the alpha blending as in the case of the normal plotting of the polygons having the transmitting attribute. Instead, the inside of each polygon having the transmitting attribute is filled by the 24-bit polygon IDs as the pixel values. When the plotting ends, the polygon ID is only written in the region of the frame buffer 8 corresponding to the polygon having the transmitting attribute, and portions other than this region has the value of 0X000000.

Figure 8:
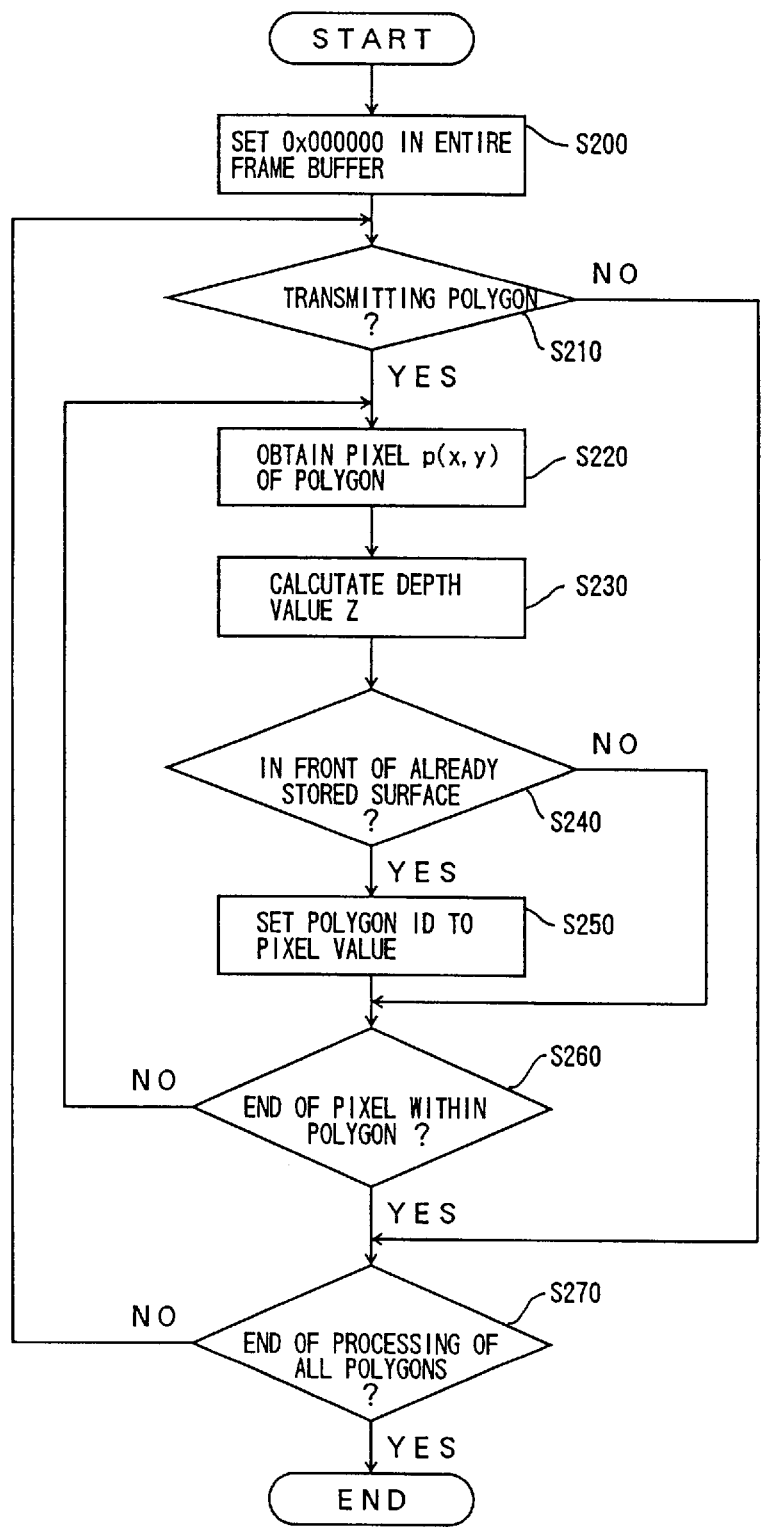
FIG. 8 is a flow chart for explaining the operation of a second image generator in the embodiment of the polygon grouping apparatus.

FIG.8 is a flow chart for explaining the operation of the second image generator 14. The second image generator 14 initially sets 0X000000 in the entire frame buffer 8 in a step S200, and decides whether or not the detected polygon is a transmitting polygon in a step S210. If the decision result in the step S210 is NO, the process advances to a step S270 which will be described later so as to process a next polygon if any. On the other hand, if the decision result in the step S210 is YES, a polygon pixel p(x, y) within the polygon is obtained in a step S220, and the depth value Z of this pixel is calculated in a step S230. A step S240 decides whether or not the calculated depth of the pixel is located in front of a surface which is already stored, and if the decision result is NO, the process advances to a step S260 which will be described later so as to process the next pixel. On the other hand, if the decision result in the step S240 is YES, a step S250 sets the polygon ID to the pixel value of the pixel p(x, y). The step S260 decides whether or not the end of the pixel within the polygon is reached, and the process returns to the step S220 if the decision result in the step S260 is NO. On the other hand, if the decision result in the step S260 is YES, the step S270 decides whether or not the processing of all polygons has ended. The process returns to the step S210 if the decision result in the step S270 is NO, so as to process the next polygon. The operation of generating the second image ends if the decision result in the step S270 is YES.

Figure 9:
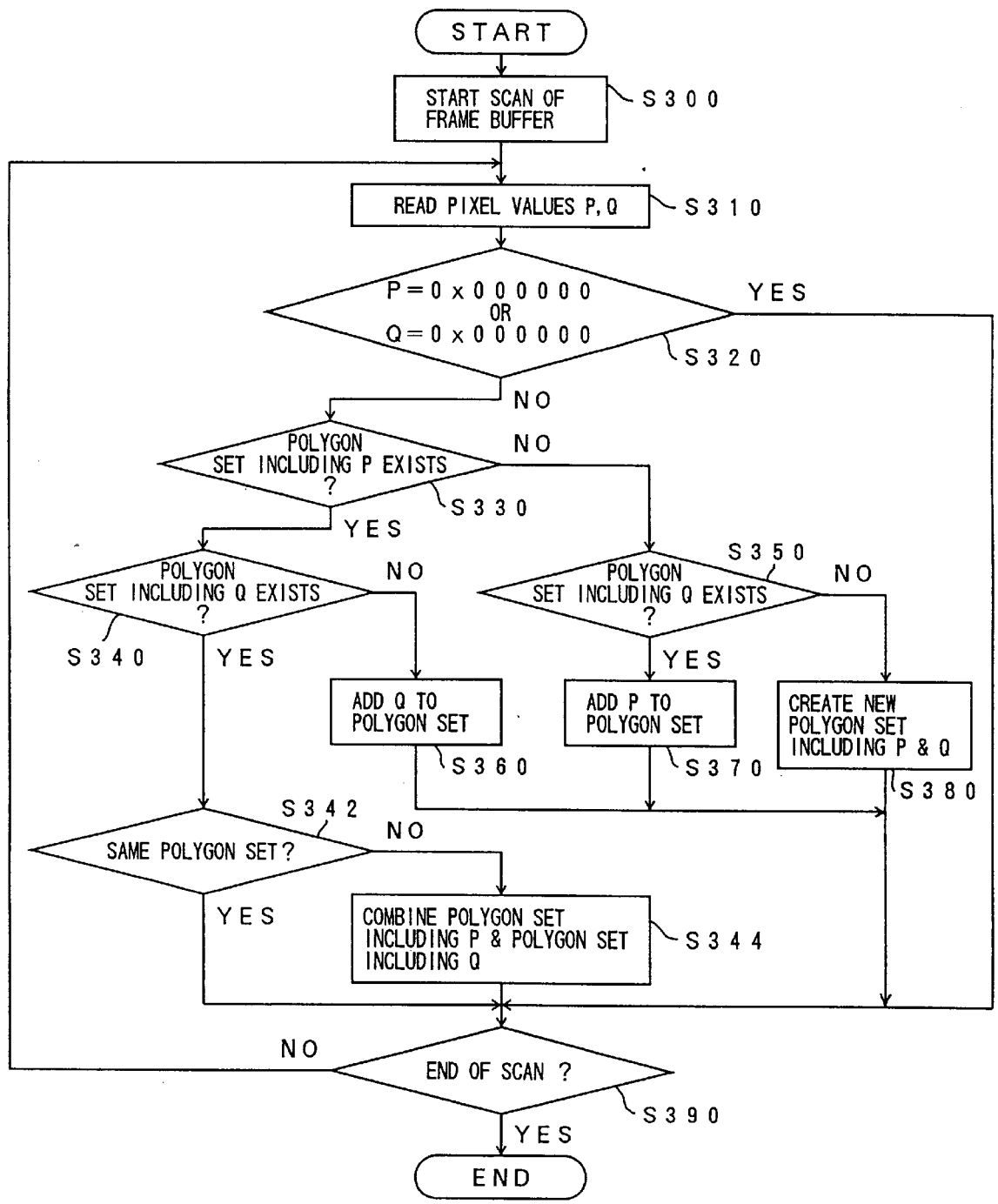
FIG. 9 is a flow chart for explaining the operation of a polygon set extractor in the embodiment of the polygon grouping apparatus.

Next, a more detailed description will be given of the operation of the polygon set extractor 18, by referring to FIG.9. FIG.9 is a flow chart for explaining the operation of the polygon set extractor 18 in the embodiment of the polygon grouping apparatus shown in FIG.4.

The polygon set extractor 18 is cleared when started, and simultaneously starts scanning the frame buffer 6 and the frame buffer 8 in a step S300. The pixel values (that is, polygon IDs) P and Q of the coordinates (x, y) of the frame buffers 6 and 8 are respectively read in a step S310. A step S320 decides whether the read pixel value P is 0X000000 or the read pixel value Q is 0X000000. If one of the read pixel values P and Q is 0X000000 and the decision result in the step S320 is YES, the process advances to a step S390 which will be described later, and no registration is made to the polygon sets. On the other hand, when both the pixel values P and Q are not 0X000000 and the decision result in the step S320 is NO, a step S330 decides whether or not there is an existing polygon set including the pixel value P.

If the decision result in the step S330 is YES, a step S340 decides whether or not there is an existing polygon set including the pixel value Q. If there is an existing polygon set including the pixel value Q, this existing polygon set includes the polygons of both the pixel values P and Q. If the decision result in the step S340 is YES, a step S342 decides whether or not the polygon set including the pixel value P and the polygon set including the pixel value Q are the same. If the polygon set including the pixel value P and the polygon set including the pixel value Q are the same, there already exists a polygon set including both the pixel values P and Q. Hence, if the decision result in the step S342 is YES, the process advances to the step S390 so as to process the next pixel. On the other hand, if the polygon set including the pixel value P and the polygon set including the pixel value Q are different and the decision result in the step S342 is NO, a step S344 combines the two polygon sets to create a single polygon set, and the process advances to the step S390.

If there is no existing polygon set including the pixel value Q and the decision result in the step S340 is NO, a step S360 adds the pixel Q to the polygon set including the pixel P, and the process advances to the step S390.

Further, if there is no existing polygon set including the pixel P and the decision result in the step S330 is NO, a step S350 decides whether or not there is an existing polygon set including the pixel value Q. If the decision result in the step S350 is YES, a step S370 adds the pixel value P to the polygon set including the pixel value Q, and the process advances to the step S390. On the other hand, if the decision result in the step S350 is NO, a step S380 creates a new polygon set including the pixel values P and Q, and the process advances to the step S390.

The step S390 decides whether or not the scanning of the frame buffers 6 and 8 has ended. If unscanned pixels remain and the decision result in the step S390 is NO, the process returns to the step S310 so as to process the next pixel. When all of the pixels are processed and the decision result in the step S390 is YES, the polygon set extracting process with respect to one view point information ends.

Next, a more detailed description will be given of the polygon group determination unit 18 of this embodiment of the polygon grouping apparatus.

After the process of the polygon set extractor 16 ends, the polygon group determination unit 18 divides the polygons into n groups corresponding to the n CG plotting accelerators $22_1$ through $22_n$ based on the obtained polygon sets. Those polygons which do not belong to a polygon set after the process carried out by the polygon set extractor 16 are respectively treated by the polygon group determination unit 18 as a polygon set having a single element. The polygons are grouped so that the total number of polygons included in each group becomes uniform as much as possible, by distributing the polygon sets into N polygon groups. Accordingly, the polygon having the transmitting attribute and related to the alpha blending and the polygon having the non-transmitting attribute and concealed by this polygon having the transmitting attribute are distributed to the same polygon group.

In addition, the polygon group determination unit 18 sorts the polygons within the polygon group, so that the polygon with α value which is not equal to 1.0 is registered to the rear of the polygon with α=1.0. For example, such a registration sequence can easily be realized by registering the polygons within the polygon group using a list structure. By plotting the polygons within the polygon group in the registered sequence, it is possible to easily satisfy the required condition which is to plot the non-transmitting polygon before the transmitting polygon, and the computer graphics image having the correct concealed relationship is plotted.

The CG model which is divided into n polygon groups may be stored in the CG model database 2. The data of the CG model are supplied to the n CG plotting accelerators 22₁ through 22ₙ as the input data, and the polygons within the same polygon group are supplied to the same CG plotting accelerator.

In the embodiment described above, the view point information database part 4 is described as being made up of a view point information database. However, the view point information database part 4 may have a construction shown in FIG. 10 in another embodiment of the polygon grouping apparatus according to the present invention.

Figure 10:
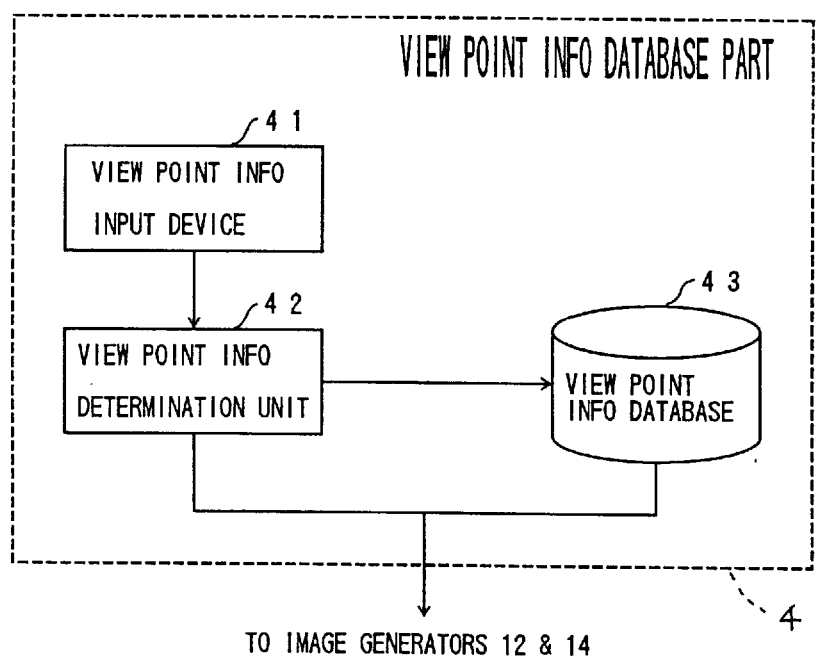
FIG. 10 is a system block diagram showing the construction of a view point information database part in another embodiment of the polygon grouping apparatus according to the present invention.

In FIG. 10, the view point information database part 4 includes a view point information input device 41, a view point information determination unit 42. The operator successively inputs the view point information from the view point information input device 41 which may be a mouse, a joystick or the like. The view point information determination unit 42 outputs the view point information set by the view point information input device 41.

Of course, the view point information specified by the operator and input via the view point information input device 41 may be registered in a storage 43 as the view point information database. In this case, the registered view point information can be read from the storage 43, that is, the view point information database.

In the embodiments described above, the first and second image generators 12 and 14 and the n CG plotting accelerators 22₁ through 22ₙ are independent units. However, it is possible to provide the first and second image generators 12 and 14 in at least one of the n CG plotting accelerators 22₁ through 22ₙ.

Further, the present invention is not limited to these embodiments, but various variations and modifications may be made without departing from the scope of the present invention.

What is claimed is:

1. A polygon overlap extraction method of extracting an overlapping relationship of polygons in a computer graphics system which plots a polygon having a transmitting attribute and a polygon having a non-transmitting attribute based on a polygon model, said polygon overlap extraction method comprising the steps of:
   (a) obtaining a first value which indicates a visible surface from data in a computer graphics model in a computer related to the polygon having the non-transmitting attribute and a second value which indicates a visible surface from data related to both the polygons having the non-transmitting attribute and the transmitting attribute, with respect to each pixel;
   (b) comparing the first value and the second value and judging whether or not an overlapping relationship exists between the polygon having the transmitting attribute and the polygon having the non-transmitting attribute at each pixel;
   (c) obtaining a polygon set of the polygon in the polygon model having the non-transmitting attribute and the polygon in the polygon model having the transmitting attribute which are judged as having the overlapping relationship; and
   (d) distributing the polygon set to computer graphics accelerators.

2. The polygon overlap extraction method as claimed in claim 1, wherein:
   said first value indicates an identifier of a background or a polygon having the non-transmitting attribute and located on the visible surface;
   said second value indicates an identifier of the background or a polygon having the non-transmitting or transmitting attribute and located on the visible surface; and
   said step (b) judges that the overlapping relationship exists between the polygon having the transmitting attribute and the polygon having the non-transmitting attribute when the first value indicates the identifier of the polygon having the non-transmitting attribute and the second value indicates the identifier of the polygon having the transmitting attribute.

3. The polygon overlap extraction method as claimed in claim 1, wherein said step (a) writes the first value indicating the polygon having the non-transmitting attribute into a first frame buffer and writes the second value indicating the polygons having the non-transmitting and transmitting attributes into a second frame buffer by using depth information.

4. The polygon overlap extraction method as claimed in claim 1, wherein said step (c):
   forms a new polygon set consisting of the polygon having the non-transmitting attribute and the polygon having the transmitting attribute if the polygon having the non-transmitting attribute and the polygon having the transmitting attribute, which are judged as having the overlapping relationship, both do not match the polygons within a polygon set that is already extracted,
   adds one of the polygons having the non-transmitting attribute and the transmitting attribute to the polygon set that is already extracted if the other of the polygons having the non-transmitting attribute and the transmitting attribute and judged as having the overlapping relationship matches the polygon within the polygon set that is already extracted,
   combines a separate polygon set with another polygon set if both of the polygons having the non-transmitting attribute and the transmitting attribute and judged as having the overlapping relationship match the polygons within the separate polygon set that is already extracted, and
   maintains the polygon set that is already extracted as it is if both the polygons having the non-transmitting attribute and the transmitting attribute match the polygons within the polygon set that is already extracted.

5. A polygon grouping method comprising the steps of:
   (a) reading polygon data of a computer graphics model in a computer related to polygons having a transmitting and a non-transmitting attribute; and
   (b) distributing the polygons within the polygon data to computer graphics accelerators and plotting the computer graphics,
   said step (b) including:
      a view point information setting step of setting view point information for plotting the computer graphics;
      an image forming step of obtaining a first value which indicates a visible surface from data related to a polygon having the non-transmitting attribute and a second value which indicates a visible surface from data related to both the polygons having the non-transmitting attribute and the transmitting attribute, with respect to each pixel;
      a judging step of comparing the first value and the second value and judging whether or not an overlapping relationship exists between the polygon having the transmitting attribute and the polygon having the non-transmitting attribute at each pixel;

a polygon set extracting step of obtaining a polygon set of the polygon having the non-transmitting attribute and the polygon having the transmitting attribute which are judged as having the overlapping relationship; and a polygon set distributing step of distributing the polygon set to the computer graphics accelerators.

6. The polygon grouping method as claimed in claim 5, wherein said view point information setting step, said image forming step, said judging step and said polygon set extracting step are repeated.

7. The polygon grouping method as claimed in claim 6, wherein:

said first value indicates an identifier of a background or a polygon having the non-transmitting attribute and located on the visible surface;

said second value indicates an identifier of the background or a polygon having the non-transmitting or transmitting attribute and located on the visible surface; and said judging step judges that the overlapping relationship exists between the polygon having the transmitting attribute and the polygon having the non-transmitting attribute when the first value indicates the identifier of the polygon having the non-transmitting attribute and the second value indicates the identifier of the polygon having the transmitting attribute.

8. The polygon grouping method as claimed in claim 6, wherein said image forming step writes the first value indicating the polygon having the non-transmitting attribute into a first frame buffer and writes the second value indicating the polygons having the non-transmitting and transmitting attributes into a second frame buffer by using depth information.

9. The polygon grouping method as claimed in claim 6, wherein said view point information setting step obtains predetermined view point information from a view point information database.

10. The polygon grouping method as claimed in claim 6, wherein said view point information setting step obtains the view point information response to an external instruction.

11. The polygon grouping method as claimed in claim 6, wherein said polygon set extracting step includes registering the extracted polygon set and adding a newly extracted polygon set to the registered polygon set.

12. The polygon grouping method as claimed in claim 6, wherein the distributed polygon sets are stored during the polygon set distributing step.

13. A polygon grouping apparatus comprising:

first image generating means for generating a first pixel value corresponding to a polygon having a non-transmitting attribute or a background in response to polygon data of a computer graphics model and view point information that is used for plotting the computer graphics model;

second image generating means for generating a second pixel value corresponding to a polygon having the non-transmitting or transmitting attribute or the background in response to the polygon data of the computer graphics model and the view point information;

polygon set extracting means for comparing the first pixel value generated by the first image generating means and the corresponding second pixel value generated by the second image generating means to judge whether or not the polygon having the non-transmitting attribute conceals the polygon having the transmitting attribute and for extracting the polygon having the non-transmitting attribute and the polygon having the transmitting attribute as a polygon set if the polygon having the non-transmitting attribute conceals the polygon having the transmitting attribute; and polygon group determination means for distributing the polygon sets from the polygon set extracting means to a plurality of accelerators for plotting computer graphics.

14. The polygon grouping apparatus as claimed in claim 13, wherein the polygon group determination means distributes the polygon data of the computer graphics model to the accelerators so that the polygons having the plotting-order-dependent relationship are distributed to the same accelerator, said plotting-order-dependent relationship referring to a restrictive condition such as a restriction that requires a first polygon to be plotted before a second polygon.

15. A polygon overlap extraction apparatus to extract an overlapping relationship of polygons in a computer graphics system of a computer which plots a transmitting polygon having a transmitting attribute and a non-transmitting polygon having a non-transmitting attribute based on a polygon model, comprising:

a first image generator to generate a first value related to the non-transmitting polygon and a second image generator to generate a second value related to both the non-transmitting and the transmitting polygon in a computer graphics model of a computer; and a polygon set extractor to compare the first and second values and to extract a set including a non-transmitting polygon that overlaps a transmitting polygon.

* * * * *